US009578999B2

(12) United States Patent
Schwartz

(10) Patent No.: US 9,578,999 B2
(45) Date of Patent: Feb. 28, 2017

(54) DECORATIVE STONE AND METAL BAR FOR ARCHITECTURAL USE

(71) Applicant: Robert Schwartz, New York, NY (US)

(72) Inventor: Robert Schwartz, New York, NY (US)

( * ) Notice: Subject to any disclaimer, the term of this patent is extended or adjusted under 35 U.S.C. 154(b) by 72 days.

(21) Appl. No.: 14/685,682

(22) Filed: Apr. 14, 2015

(65) Prior Publication Data

US 2015/0290965 A1 Oct. 15, 2015

Related U.S. Application Data

(60) Provisional application No. 61/979,070, filed on Apr. 14, 2014.

(51) Int. Cl.

| | |
|---|---|
| ***F16S 3/00*** | (2006.01) |
| ***A47K 10/04*** | (2006.01) |
| ***A47K 17/02*** | (2006.01) |
| ***E04F 11/18*** | (2006.01) |
| ***E05B 1/00*** | (2006.01) |

(52) U.S. Cl.

CPC ............ *A47K 10/04* (2013.01); *A47K 17/022* (2013.01); *E04F 11/1804* (2013.01); *E04F 11/1838* (2013.01); *E05B 1/0015* (2013.01); *E04F 2011/1891* (2013.01)

(58) Field of Classification Search

CPC F16S 3/00; A47K 10/04; A47K 10/10; A47H 1/02; A47H 2001/0205; Y10T 428/24008

USPC ........................................................... 428/99

See application file for complete search history.

(56) References Cited

U.S. PATENT DOCUMENTS 5,505,245 A * 4/1996 Badalamenti ............ A47H 2/00 160/38

FOREIGN PATENT DOCUMENTS

| | | | |
|---|---|---|---|
| CN | 2857765 | Y | 12/2005 |
| CN | 201284914 | Y | 10/2006 |

* cited by examiner

*Primary Examiner* — Alexander Thomas

(74) *Attorney, Agent, or Firm* — Karl F. Milde, Jr.; Eckert Seamans Cherin & Mellott, LLC

(57) ABSTRACT

A decorative bar, configured to be mounted on a surface (wall or floor) of a room or building, comprises (a) an elongate rod formed of natural stone and having a substantially constant cross-sectional shape from a first end to an opposite, second end and a longitudinal groove extending along one side, and (b) an elongate metal armature or brace having a portion thereof inserted in and substantially filling the longitudinal groove in the stone rod. The metal brace has a flange or bracket at each end configured to be attached to the surface (wall or floor) of a building to affix and retain the stone rod in a mounted relationship to this surface with its longitudinal groove on a side which is not readily visible to a casual observer.

30 Claims, 15 Drawing Sheets

DECORATIVE STONE AND METAL BAR FOR ARCHITECTURAL USE

CROSS-REFERENCE TO RELATED APPLICATION

This application claims priority from Provisional Application No. 61/979,070 filed Apr. 14, 2014, and entitled "TOWEL BAR."

BACKGROUND OF THE INVENTION

The present invention relates to a decorative bar or rail formed of a natural stone rod combined with a metal armature or bracketed structure which is configured to be mounted on a wall surface of a room or a floor surface of a building to provide an attractive and useful holder or railing.

For example, the stone and metal bar may be installed on the wall of a bathroom for use as a towel holder or a hand support; it may be installed on a door as a door pull; it may be installed in a closet for use as a rod on which to hang clothes; or it may be mounted on vertical supports on the side of a staircase to serve as a hand or guard rail or as the cap on a railing at a balcony edge. In general, the present invention is intended to add an attractive architectural accent in any situation where a bar or railing is provided in a building.

The use of stone for architectural purposes is known throughout history. Large vertical columns have graced the facades of buildings since early Greco-Roman times. Natural stone is a durable and attractive building material but its use has been limited by its lack of tensile strength. When used in compression, as in vertical stone columns for example, the stone is capable of bearing enormous loads. However, when a lateral force is applied that causes internal tension, for example when weight is applied to the center of a horizontal stone beam, the stone has a tendency to crack. For this reason metals and plastics have long since replaced stone as the materials of choice for architectural purposes where a tensile force is present or expected.

It is known from the Chinese Patent No. 2857765Y to reinforce a bar made of stone by means of an internal metal rod. The disclosed bar is intended for use in a bathroom, for example as a towel bar or shower curtain rod. A cylindrical metal rod is somehow embedded in the center of a stone bar, which may be round or square in cross-section, presumably by drilling a round hole along the longitudinal central axis of the stone. Once reinforced in this way, the bar can be placed in use horizontally presumably by supporting it at both ends in a manner that is not defined or explained.

The Chinese Patent No. 201284914Y discloses an improvement in this prior art stone bar which avoids drilling a long hole through the center of the bar. This reference teaches the reinforcement of stone curtain rods, towel racks and the like by inserting a metal rod in a longitudinal notch or groove on one or more sides of the bar and affixing the rod(s) to the stone by means of an adhesive. The metal rod can be round, square or even triangular in cross-section. It can fill a groove in the stone bar or be covered by a separate, filler material that fills the remainder of the groove. Once inserted, however, the metal rod fulfills no other purpose than to reinforce the stone bar. As in the case with the Chinese Patent No. 2857765Y, this metal rod is substantially hidden from view.

These two prior art references, taken together, teach how natural stone bars may be reinforced. However, the reinforced stone bars, so constructed, must be held by some type of supporting fixture when installed in a bathroom or the like. This supporting fixture must presumably grip or clamp the outer surface of the stone which, being brittle, is subject to damage, either upon installation or during use. Because this configuration as not robust, such stone bars may be considered impractical for architectural use. Furthermore, these references teach making substantial cuts or openings in the stone bars for insertion of the reinforcing metal rods.

The Chinese Patent No. 2857765Y shows that the diameter of the metal rod is approximately one-third the diameter or width of the stone bar. It would be exceedingly difficult to drill a longitudinal hole through a stone rod from one end to the other. The Chinese Patent No. 201284914Y discloses various types of stone bars with various configurations of longitudinal grooves for insertion of the metal rods. In each embodiment shown, the groove is approximately one quarter of the width of the stone bar. In all cases where a round or square metal rod is embedded in a stone bar for reinforcement, this rod must have sufficient thickness to withstand any bending stresses that are anticipated. The substantial cuts in the stone, for the purposed of reinforcement, result in a weakened stone structure which is naturally fragile and brittle and therefore subject to breakage.

SUMMARY OF THE INVENTION

It is a principal objective of the present invention, therefore, to provide means for both reinforcing and holding a natural stone rod in a robust manner for architectural use which enhances the overall attractiveness, usefulness and practicality of an installation and allows for a broader range of applications.

This objective, as well as other objectives which will become apparent from the discussion that follows, is achieved, according to the present invention, by providing a decorative bar configured to be mounted on a surface (wall or floor) of a room or building, which comprises (a) an elongate rod formed of natural stone and having a substantially constant cross-sectional shape from a first end to an opposite, second end and a longitudinal groove extending along one side, and (b) an elongate metal armature or bracketed support member, collectively to be referred to as a brace, having a portion thereof inserted in and substantially filling the longitudinal groove in the stone rod. The metal brace has a flange or bracket at each end, and at a midpoint or other intervals necessary for support in the case of a long stone rod, configured to be attached to a surface of a building to affix and retain the stone bar in a mounted relationship to this surface with its longitudinal groove on a side which is not readily visible to a casual observer.

To provide tensile strength to the stone rod without removing a substantial amount of the stone, the portion of the metal brace that is inserted in and substantially fills the longitudinal groove in the stone is preferably a relatively flat piece of material, with a height dimension substantially greater than the thickness dimension. Because of the structural dynamics involved, the metal can be quite thin. In a preferred embodiment of the present invention, this portion of the metal brace has a thickness of approximately ⅛ of an inch. The metal thickness could range from 1/16 to ⅜ of an inch, depending upon the proportions of the stone rod and the span of the bar.

In another preferred embodiment of the present invention the portion of the metal brace that is inserted in the stone has an "L" shaped cross-section in the region thereof which includes the portion inserted in the groove, with this inserted section being formed by an upper, or vertical portion of the "L". The horizontal flange of the "L" shaped angle serves to stabilize the bar against lateral force. In other preferred embodiments the inserted portion of the metal brace has a "T" shaped cross-section or a Christian cross-shaped cross-section.

Preferably also, the groove in the stone rod has a depth substantially equal to or slightly less than one half of the height or diameter of the stone rod, and a width dimension slightly greater than the width dimension of the portion of the metal brace that is inserted into the groove. In one preferred embodiment of the invention the depth of the groove as in the range of ⅝ to ¾ of an inch for a stone rod that is approximately 1½ inches thick.

The stone rod can have any cross-sectional contour, but for aesthetic purposes the cross section is preferably egg-shaped, oval, circular, rectangular (including square) or trapezoidal.

Advantageously a layer of adhesive is provided in the groove between the stone bar and the aforesaid portion of the metal brace, bonding the stone to the metal and thereby creating one structurally unified piece.

In one embodiment of the invention the longitudinal groove in the stone rod extends all the way from one end to the other. This longitudinal groove has a constant depth over the full length of the stone rod. In another embodiment of the invention the longitudinal groove extends along the length of the stone rod from a point adjacent to the first end, without reaching the first end, and/or to a point adjacent to the second end without reaching the second end, thus stopping short of one or both ends. In this case the groove preferably tapers from the substantially constant depth to a zero depth near the respective end. The taper can be linear or, advantageously, a segment of a circle formed by the rotating cutting instrument that creates the groove. Alternatively, the groove can have a non-tapered jump, or step, from its maximum depth to zero depth.

The attachment flanges or brackets at each end of the metal brace may assume any number of configurations, depending upon the architectural requirements. Advantageously, the flanges or brackets may be configured such that the decorative bar can be mounted horizontally to a vertical surface, such as a bathroom wall. For example, both flanges may be configured to mount the bar such that it is horizontal and parallel to the wall surface, as in the case of a typical towel bar installation. Alternatively, the flanges at opposite ends of the bar can be configured such that they mount on intersecting perpendicular wall surfaces, such as a 90 degree corner in a room, creating a corner-mounted bar. Advantageously, a corner-mounted bar is an efficient use of space. Additionally, supporting a bar from two perpendicular walls is inherently more stable than cantilevering the bar from one wall. In another embodiment the flanges can be configured to mount to parallel walls that are perpendicular to the bar such that the bar spans from wall to wall, as with a bar for hanging clothes in a closet or alcove.

In another embodiment of the invention the flanges or brackets can be configured to facilitate mounting the bar on one or more floor surfaces, such as the surfaces of a staircase, thus forming a handrail for the stairs. Alternatively the bar can be mounted to posts that are secured to a floor, such as posts at a balcony edge, creating a railing cap at the balcony edge.

For a full understanding of the present invention, reference should now be made to the following detailed description of the preferred embodiments of the invention as illustrated in the accompanying drawings.

DETAILED DESCRIPTION OF THE PREFERRED EMBODIMENTS

Figure 1:
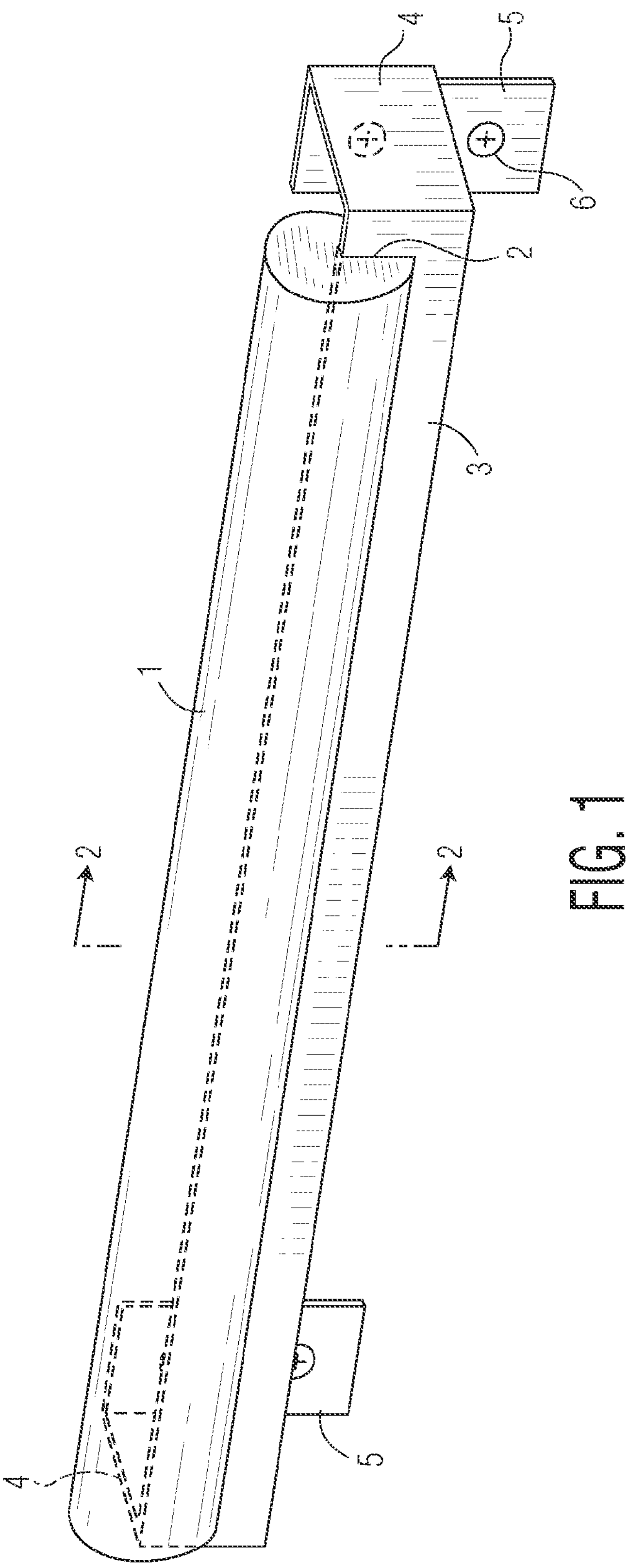
FIG. 1 is a front-view perspective showing one preferred embodiment of a towel bar according to the invention.

The preferred embodiments of the present invention will now be described with reference to FIGS. 1-22 of the drawings. Identical elements in the various figures are identified with the same reference numerals.

Briefly in overview, the present invention relates to a decorative rod formed of natural stone which is adhered to a metal armature or bracketed brace. The metal brace both reinforces the stone rod and provides a means for mounting the stone rod to a surface. The brace is configured to be mounted on a wall surface of a room or on a floor surface or post of a building, to provide an attractive and useful holder, such as a towel bar, hand rail or door pull.

One preferred embodiment of this invention is the towel bar illustrated in FIGS. 1 through 5. FIG. 1 shows an elongate stone rod 1 that is egg-shaped in cross-section, supported on a metal armature. The metal armature is comprised of a front rail 3 with flanges 4 at both ends that turn 90 degrees towards the wall and wall plates 5 that turn 90 degrees and attach to a wall with fasteners 6. There is a slot, or groove 2, cut into the underside of this stone rod that allows the front metal rail 3 to insert into the stone rod. In this embodiment, as shown in this figure, the stone component is a long rod 1 ranging from 24 inches long, for one towel, to 48 inches long, for two towels. The armature is approximately 1½ inches longer than the stone rod such that the stone rod does not meet the end flanges and therefor appears to be suspended on the front metal rail.

Figure 2:
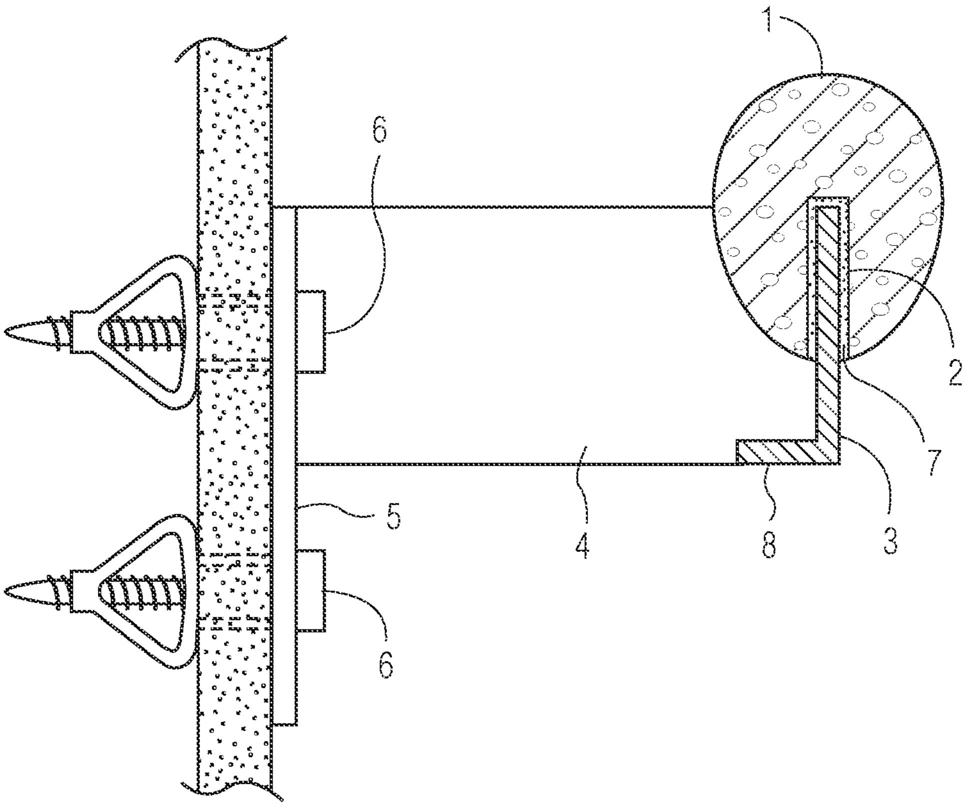
FIG. 2 is a cross section through the towel bar shown in FIG. 1, taken on the line 2-2 in FIG. 1.

FIG. 2 is a sectional drawing, taken at line 2-2 on FIG. 1. FIG. 2 shows a stone rod 1 that is approximately 1⅛ inches wide by 1½ inches tall and egg-shaped in cross section with a groove 2 in the underside that is approximately $\frac{3}{16}$ of an inch wide and ¾ of an inch deep, or roughly to the mid point of the rod. The front metal rail 3 is shown imbedded in the groove 2 in the stone rod. A layer of adhesive 7 fills the space between the metal rail and the stone and binds the stone to the metal. The imbedded metal reinforces and stabilizes the stone rod to prevent it from cracking if hit or bumped. The front metal rail 3 is approximately 1½ inches tall and ⅛ of an inch thick. A horizontal flange 8 projects approximately ½ of an inch from the backside of the rail. This flange stiffens the rail and provides resistance to lateral force. The metal side flange 4 projects approximately 2¾ inches out from the wall. The metal wall plate 5 can be seen. Fasteners 6 attach through the wall plate to secure the towel bar to the wall.

The cross sectional shape of the stone rod could alternatively be round, oval, rectangular or trapezoidal, as shown in FIGS. 13 through 18.

Figure 3:
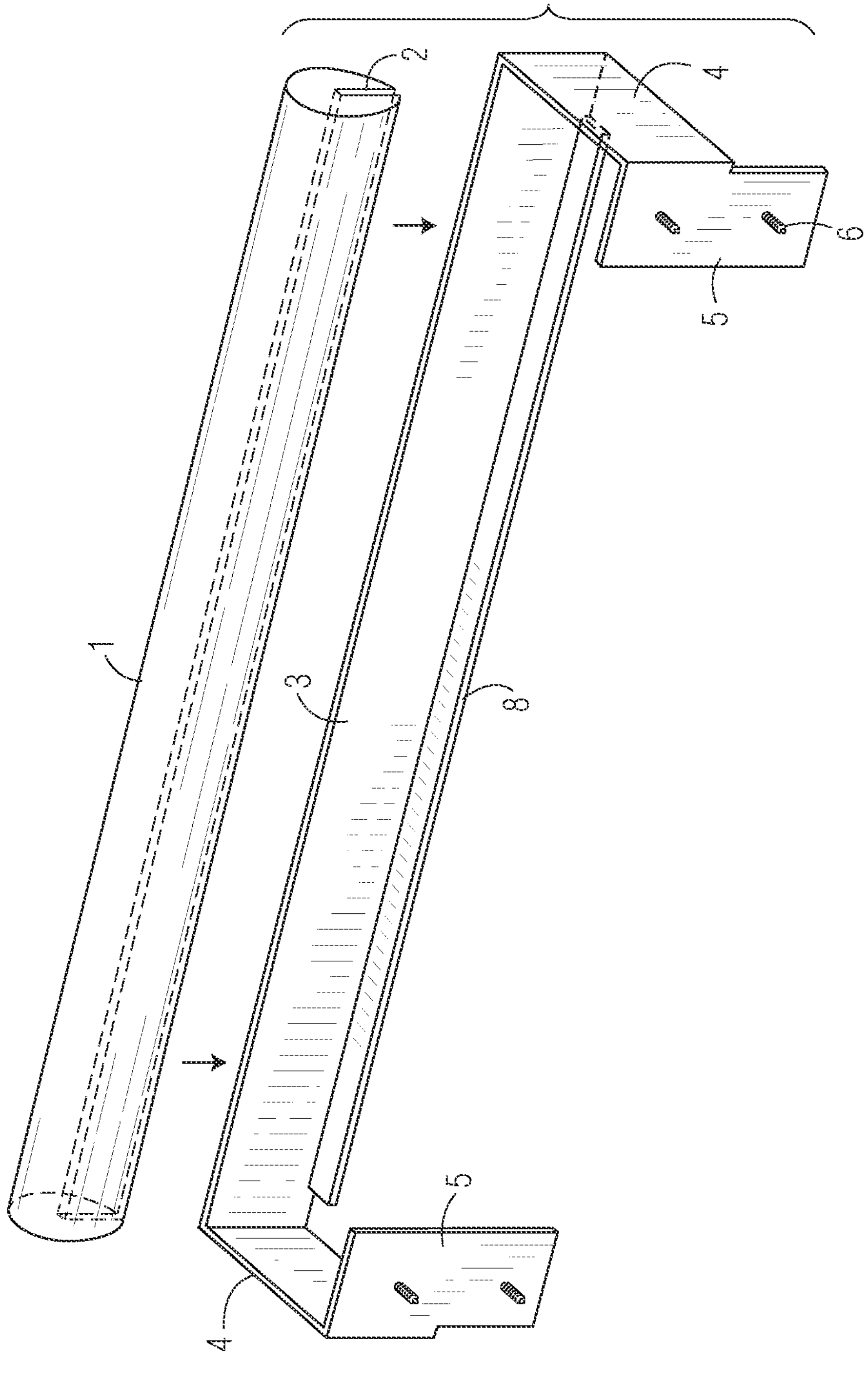
FIG. 3 is a rear-view perspective of the towel bar of FIG. 1.

FIG. 3 shows the towel bar from the back side, with the stone rod 1 separated from the metal armature. The groove 2 in the stone is continuous from end to end, allowing the metal front rail to imbed into the stone rod when the stone is lowered into place. The horizontal stiffening flange 8 stops short of the side brackets 4 so that this flange is not visible to the casual observer when the stone is in place. The back side of the wall plates 5 and fasteners 6 can be seen. The wall plates turn downward, allowing for additional fasteners and providing additional stability.

Figure 4:
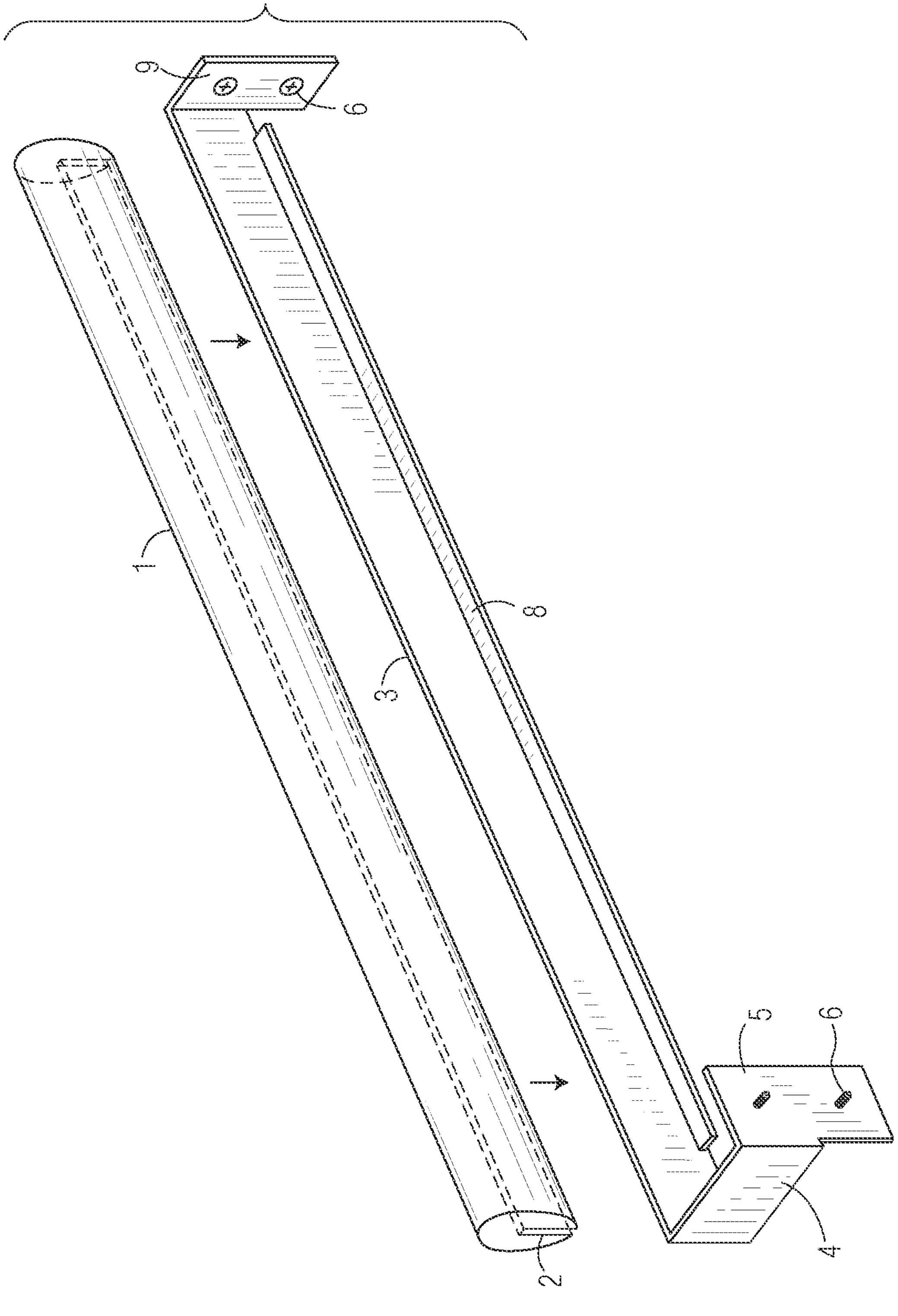
FIG. 4 is a variation of the embodiment of FIG. 1, showing a corner-mounted metal armature, or brace.
Figure 5:
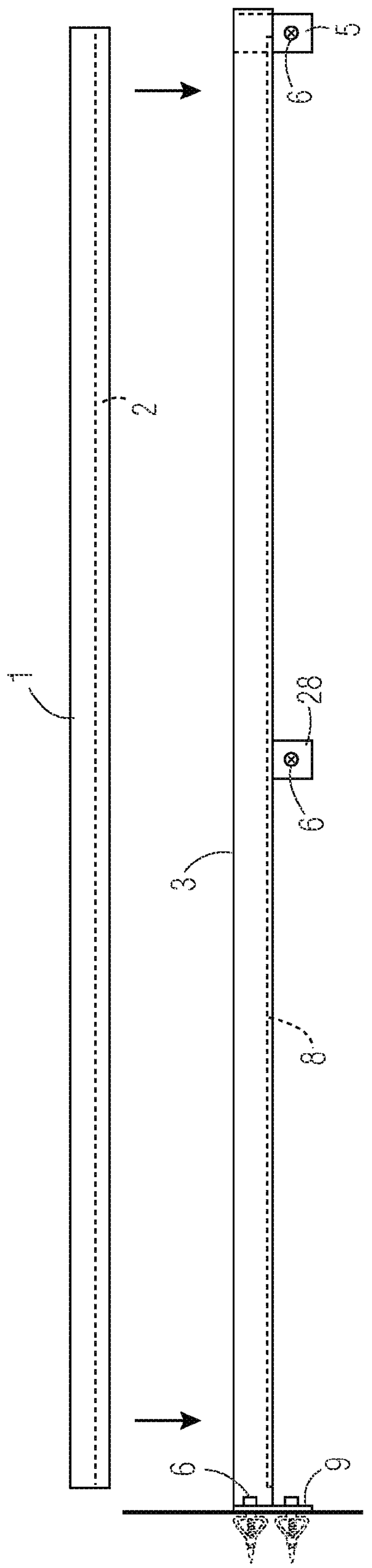
FIG. 5 is a front elevation of the corner-mounted towel bar of FIG. 4.

A variation of this preferred embodiment is illustrated in FIG. 4 and FIG. 5. The illustrated towel bar is designed to mount into a 90 degree corner. FIG. 4 shows the stone rod 1 separated from the metal armature and viewed from the back. The continuous groove 2 in the stone rod can be seen. The metal end flange 4 and wall plate 5 seen in FIG. 1 through FIG. 3 can be seen on one end of the armature in this figure. This plate 5 parallel to the stone rod. On the other end is a wall plate 9 that is perpendicular to the stone rod, and is bolted 6 to the perpendicular wall, thus forming a corner-mounted installation. FIG. 5 is a front elevation of this embodiment with the stone rod 1 separated from the metal support structure below. In this figure the typical wall plate 5 is shown on the right hand side of the drawing and the corner-mount plate 9 is shown on the left. This is a towel bar intended for two towels and the armature approximately 50 inches long. There is an additional metal bracket 28 at the center of the armature that stabilizes this long towel bar. A corner-mounted installation is an economical use of space. Mounting onto two perpendicular walls is inherently more stable than mounting onto a single wall.

Figure 6:
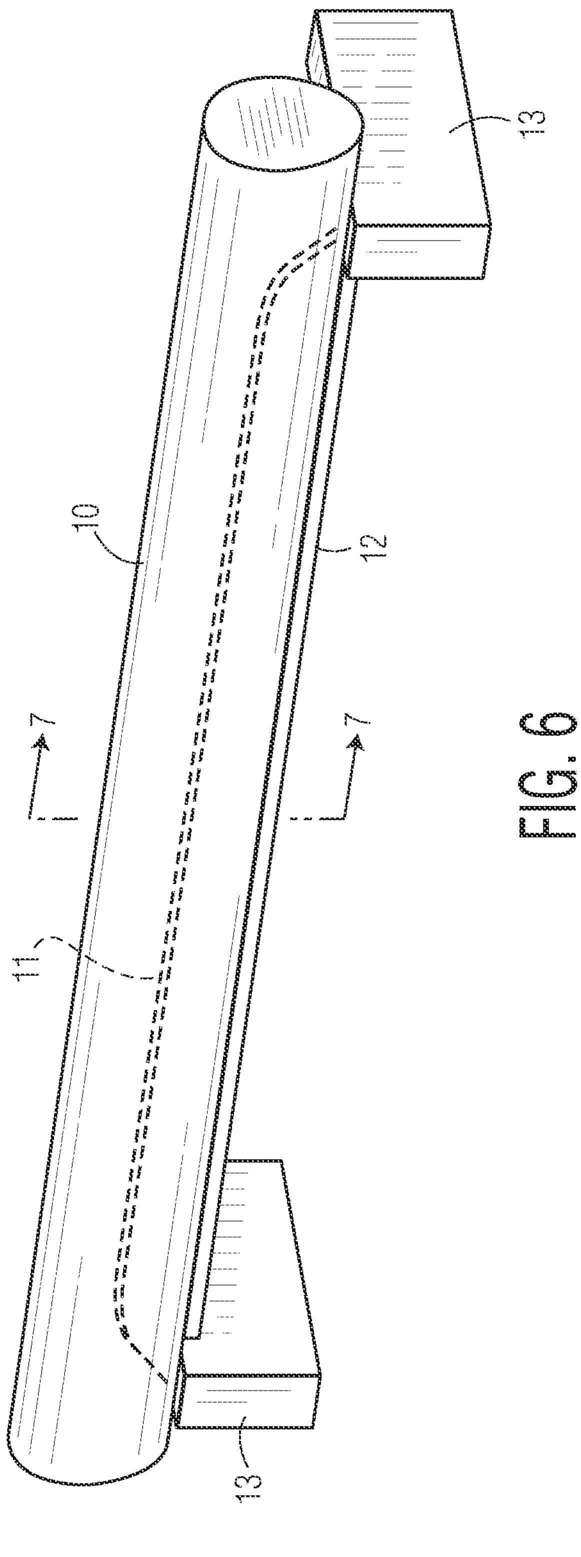
FIG. 6 is a front-view perspective showing a second preferred embodiment of a towel bar according to the invention.

A second preferred embodiment of this invention is the towel bar illustrated in FIGS. 6 through 10. In this embodiment, as shown in FIG. 6, the stone component is a long rod 10 ranging from 26 inches long, for one towel, to 50 inches long, for two towels. There is a slot, or groove 11, cut into the underside of the stone rod. This groove does not pass through the ends of the stone rod; it stops approximately one inch from each end of the stone rod. The slot is approximately ¾ of an inch deep by $\frac{3}{16}$ of an inch wide, and approximately 2 inches shorter than the stone rod. The stone rod projects beyond and appears to rest on the two metal brackets 13 near each end of the rod. Spanning between the metal brackets is a metal angle 12, most of which is imbedded into the groove in the stone rod and therefore mostly not visible.

Figure 7:
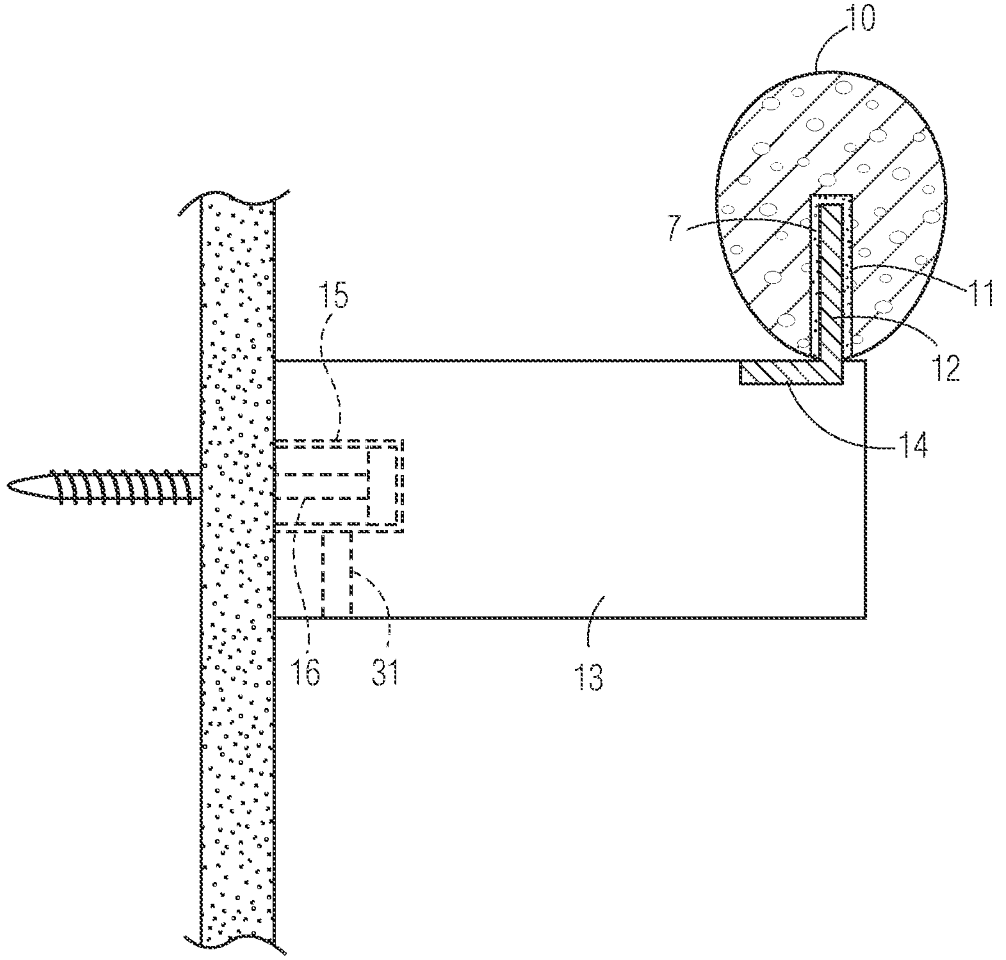
FIG. 7 is a cross section through the towel bar shown in FIG. 6, taken on the line 7-7 in FIG. 6.

FIG. 7 is a sectional drawing, taken at line 7-7 on FIG. 6. FIG. 7 shows a stone rod 10 that is approximately 1⅛ inches wide by 1½ inches tall and egg-shaped in cross section with a groove 11 in the underside that as approximately $\frac{3}{16}$ of an inch wide and ¾ of an inch deep, or roughly to the mid point of the rod. An "L" shaped metal angle 12 and 14 is shown with the upward pointing member substantially embedded in the groove in the stone rod. A layer of adhesive 7 fills the space between the metal and the stone and binds the stone and metal together. The imbedded metal angle reinforces and stabilizes the stone rod to prevent it from cracking if hit or bumped. The vertical component 12 of the angle is approximately ¾ of an inch tall and ⅛ of an inch thick. A ½ inch wide horizontal flange 14 projecting towards the wall provides resistance to lateral force. The metal angle spans between and is supported by a metal bracket 13 near each end of the towel bar. Each bracket is approximately ¾ of an inch wide by 1½ inches tall and projects 3 inches from the wall. On the back surface of each bracket is a cylindrical void 15 approximately ½ of an inch in diameter and ⅞ of an inch deep. This void allows the bracket to slide onto a cylindrical aluminum bushing that would be bolted to the wall 16. The bracket is locked into place by an Allan screw 31.

Figure 8:
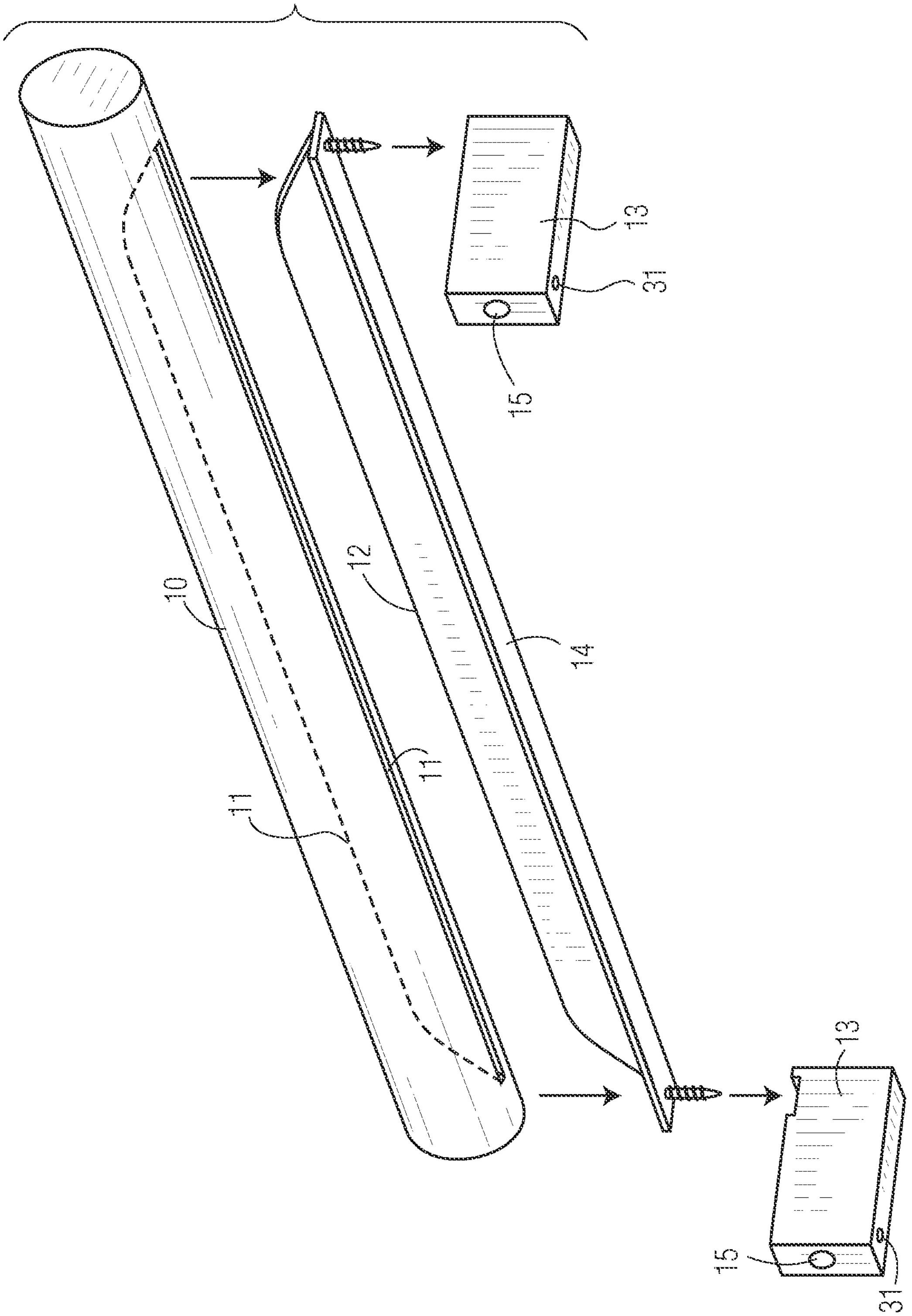
FIG. 8 is a rear-view perspective of the towel bar embodiment of FIGS. 6 and 7.

FIG. 8 shows this embodiment of the towel bar from the back side, with the stone rod 10 separated from the metal support structure. The groove 11 in the stone stops before reaching the ends of the rod. The metal angle 12 and 14 that spans between the support brackets 13 can vary in length and is dependent on the length of the stone rod. For a single-towel bar this angle would be approximately 24 inches long which is 2 inches shorter than the stone rod. The cylindrical recesses 15 for the attachment bushings can be seen on the back face of the brackets. The Allan screw holes 31 are visible on the underside of the brackets.

Figure 9:
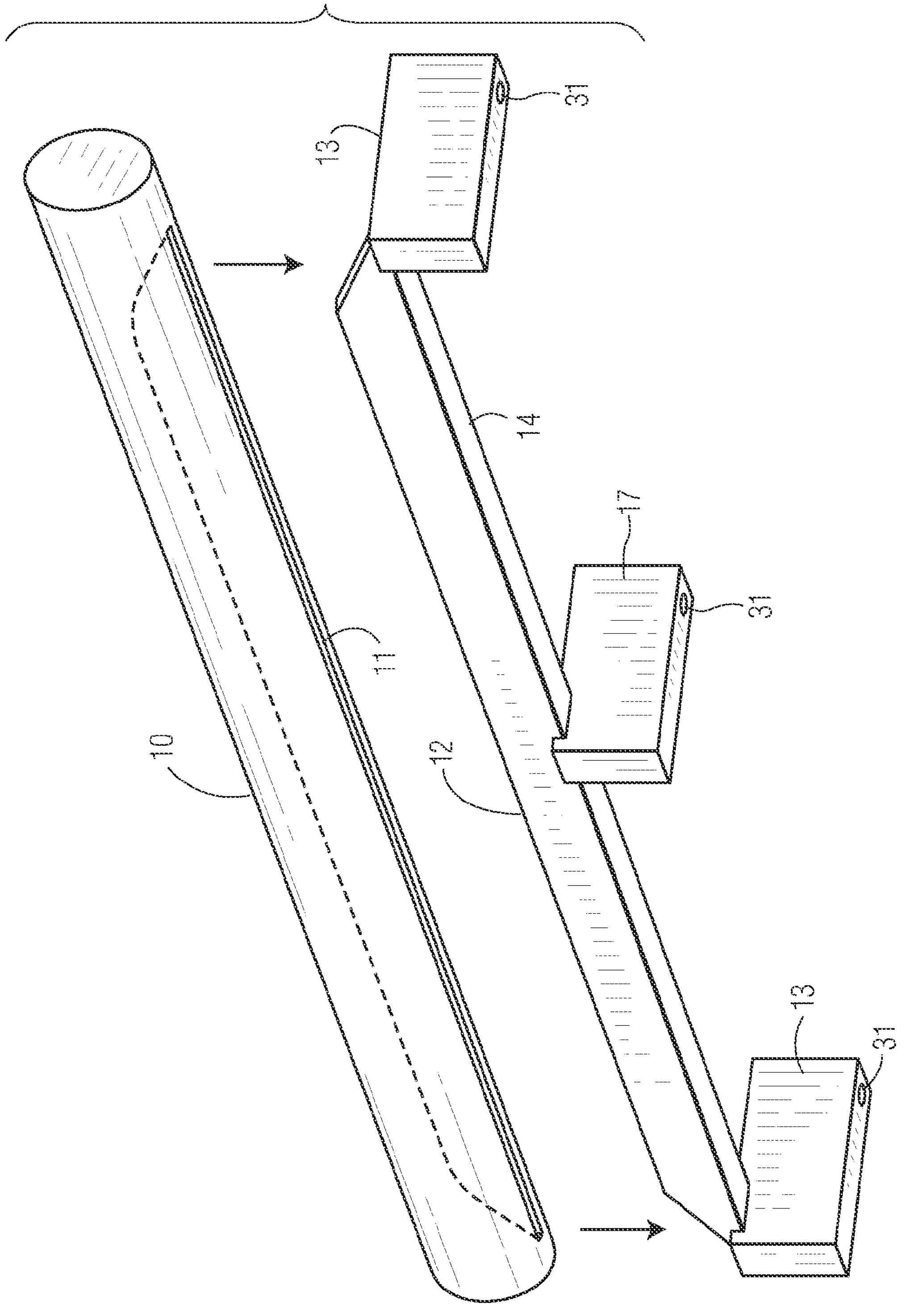
FIG. 9 is a front-view perspective showing a variation on this second embodiment, showing a longer towel bar with a center support bracket.
Figure 10A:
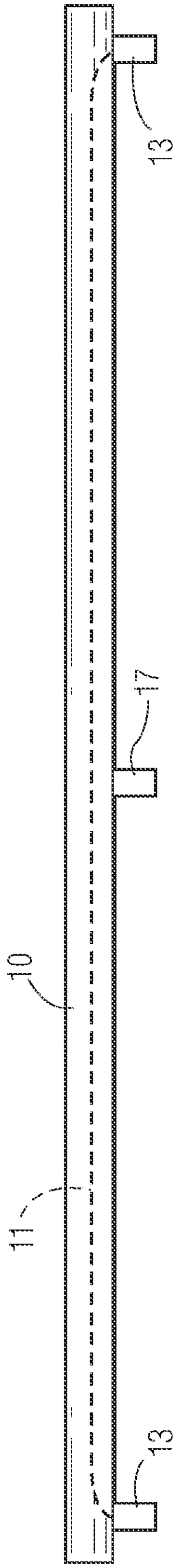
FIG. 10A is a front elevation of the towel bar shown in FIG. 9.

FIG. 9 shows a variation of this embodiment of the towel bar, viewed from the back side, with the stone rod 10 separated from the metal support structure. This figure illustrates a long bar intended for two towels and it therefore has a center bracket 17 for additional support. The stone rod would be approximately 50 inches long. The metal support angle would be about 48 inches long. FIG. 10A is a front elevation of this embodiment of the towel bar with the stone rod 10 seemingly resting on the two end brackets 13 and the center bracket 17.

Figure 10B:
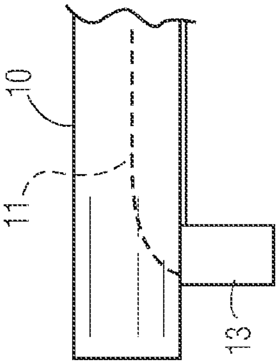
FIG. 10B is a partial elevation of the end of the stone rod showing a curved end to the slot in the stone rod.
Figure 10C:
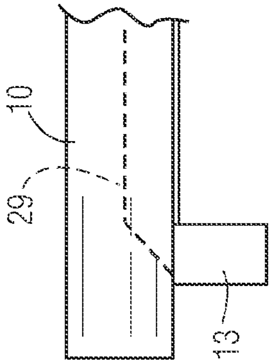
FIG. 10C is a partial elevation of the end of the stone rod showing a tapered end to the slot in the stone rod.
Figure 10D:
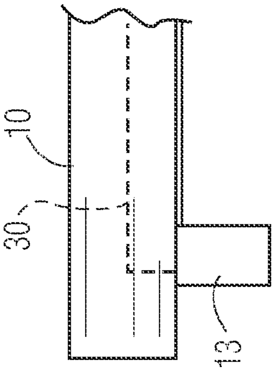
FIG. 10D is a partial elevation of the end of the stone rod showing a stepped end to the slot in the stone rod.

FIG. 10B is an enlarged partial view of left end of the towel bar shown in this preferred embodiment. The groove 11 in the stone rod 10 shown by the dotted line tapers from roughly ¾ of an inch to zero as a segment of a circle which would be created by the circular blade that is used to make the groove. FIG. 10C is a variation of this end condition which shows the groove ending with a gradual angle 29. FIG. 10D shows a stepped end to the groove. These latter two conditions might result if the groove is created with a drilling or grinding tool.

Figure 11:
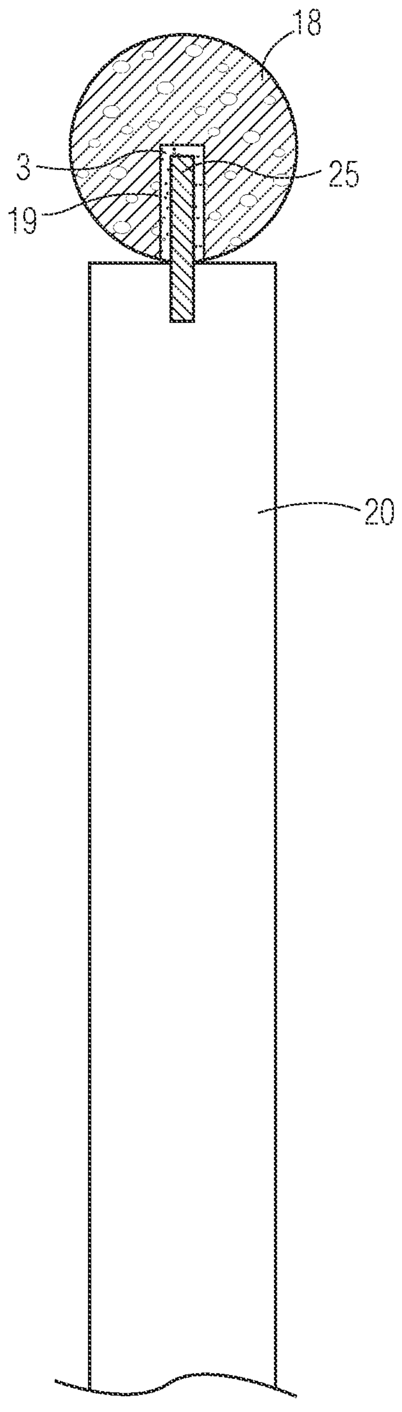
FIG. 11 is a partial section showing another preferred embodiment of the invention, in this case for a stone railing with a flat metal reinforcing bar.
Figure 12:
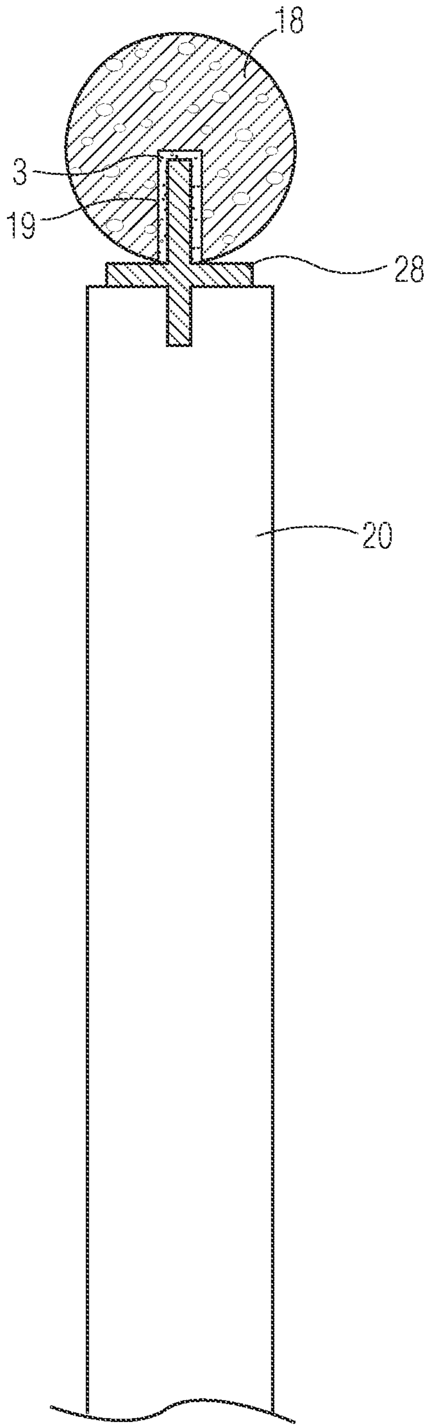
FIG. 12 is a partial section showing a variation on the preferred embodiment of FIG. 11, with a cross-shaped metal reinforcing bar.
Figure 13:
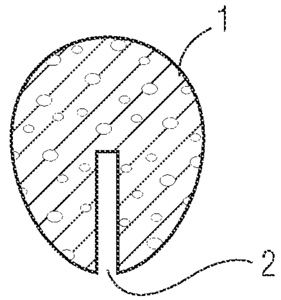
FIG. 13 shows one end of a stone rod that is egg-shaped in cross section with a groove in the bottom face that extends upward approximately to the mid-point of the height of the rod and laterally through the end of the rod.
Figure 14:
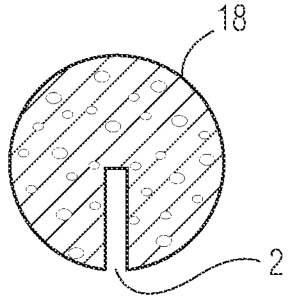
FIG. 14 shows a stone rod that is circular in cross section.

Another preferred embodiment of the invention is illustrated in FIGS. 11 and 12 which show a railing cap or hand rail. In FIG. 11 a cylindrical stone rod 18 with a groove 19 on the underside which is cut to approximately the mid point of the cylinder is shown imbedded onto a metal bar 25. Adhesive 3 bonds the stone to the metal. The stone rod and metal bar span between posts 20 that are attached to a floor. The diameter of the stone rod and the dimensions of the metal bar are dependent on the particular requirements of the installation, for example the distance between support posts. FIG. 12 shows an alternate metal supporting member 28, in the form of a Christian cross. A metal extrusion with this shape might be advantageous in some situations. It might allow for easier attachment of the metal structure to the vertical post, for example, and the horizontal flanges add stability against lateral force.

Figure 15:
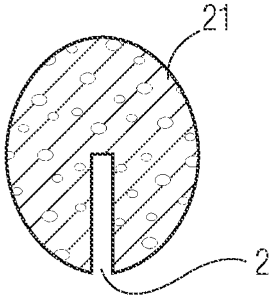
FIG. 15 shows a stone rod that is oval in cross section.
Figure 16:
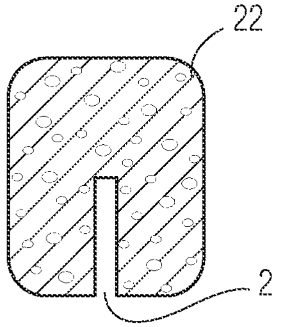
FIG. 16 shows a stone rod that is rectangular in cross section.
Figure 17:
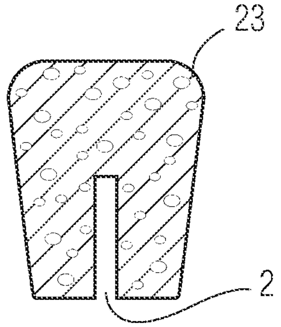
FIG. 17 shows a stone rod that is trapezoidal in cross section.

FIGS. 13 through 17 show possible cross sectional contours of the stone rod, all with a groove cut into the underside that extends to a depth of approximately the midpoint of the stone rod and through the end of the rod. The shapes shown in FIG. 13 and FIG. 14 have been seen in the embodiments described above. FIG. 15 is a rod with an oval 21 contour. FIG. 16 is a rod with a rectangle 22 contour and with rounded corners. FIG. 16 is a trapezoid 23 contour with rounded corners.

Figure 18:
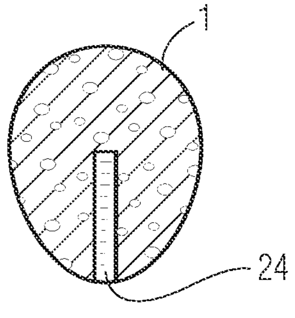
FIG. 18 shows a stone rod that is egg-shaped in cross section where the groove does not pass through the end of the rod.

FIG. 18 shows an egg-shaped rod 1 in section with a groove 24 that does not pass though the end of the rod. This groove condition could occur with any of the various cross sectional shapes.

Figure 19:
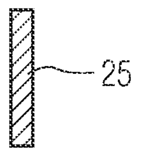
FIG. 19 shows a metal bar that is flat.
Figure 20:
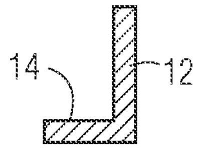
FIG. 20 shows an "L" shaped metal angle.
Figure 21:
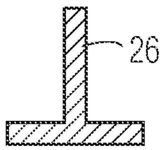
FIG. 21 shows a "T" shaped metal extrusion.
Figure 22:
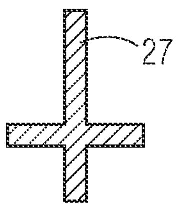
FIG. 22 shows a "+" shaped metal extrusion.

FIGS. 19 through 22 show possible cross sectional shapes of the metal member that is used to reinforce the stone rod. FIG. 19 is a flat bar 25. FIG. 20 is an "L" shaped metal angle. FIG. 21 is a "T" shaped extrusion. FIG. 22 is a Christian-cross shaped extrusion.

In each case where the claimed invention is to be installed, the specific stone rod size and shape and the specific metal brace size, shape and configuration would be determined by the particular conditions or requirements of the installation.

There has thus been shown and described a novel decorative stone and metal bar for architectural use which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which to be limited only by the claims which follow.

What is claimed is:

1. A decorative bar configured to be mounted on at least one surface of a room or building, said bar comprising:

(a) an elongate rod formed of natural stone and having a substantially constant cross-sectional shape from a first end to an opposite, second end thereof, said stone rod having a longitudinal groove therein extending along one side from a point adjacent said first end to a point adjacent said second end;

(b) an elongate metal brace having a portion thereof inserted in and substantially filling said longitudinal groove in said stone rod, said metal brace having a flange or bracket at each end thereof configured to be attached to said at least one surface, thereby to affix and retain the stone rod in a mounted relationship to said at least one surface with its longitudinal groove on a side thereof which is not readily visible to a casual observer.

2. The decorative bar defined in claim 1, wherein said portion of said metal brace inserted in said groove is a metal bar of rectangular cross-section, with a depth dimension substantially greater than a width dimension.

3. The decorative bar defined in claim 2, wherein said section of the metal brace that is inserted in and substantially fills said longitudinal groove in said stone rod is a flat piece of material.

4. The decorative bar defined in claim 3, wherein said flat piece of material has a thickness in the range of 1/16 to 3/8 of an inch.

5. The decorative bar defined in claim 4, wherein said flat piece of material has a thickness of approximately 1/8 of an inch.

6. The decorative bar defined in claim 1, further comprising a layer of adhesive in said groove between said stone rod and said portion of said metal brace.

7. The decorative bar defined in claim 1, wherein said cross-sectional shape of said stone rod is selected from the group consisting of egg-shaped, oval, circular, rectangular and trapezoidal.

8. The decorative bar defined in claim 1, wherein said longitudinal groove extends all the way from said first end of said stone rod to said opposite, second end thereof.

9. The decorative bar defined in claim 8, wherein said longitudinal groove has a substantially constant depth in said stone rod over approximately the entire length of said stone rod.

10. The decorative bar defined in claim 1, wherein said longitudinal groove in said stone rod extends along the length of said stone rod from a point adjacent to said first end thereof without reaching said first end.

11. The decorative bar defined in claim 10, wherein said longitudinal groove tapers from a substantially constant maximum depth in said stone rod to a zero depth at the end thereof adjacent to said first end.

12. The decorative bar defined in claim 11, wherein said taper is a segment of a circle.

13. The decorative bar defined in claim 11, wherein said taper is linear.

14. The decorative bar defined in claim 10, wherein said longitudinal groove steps from a substantially constant maximum depth in said stone rod to a zero depth at the end thereof adjacent to said first end.

15. The decorative bar defined in claim 1, wherein said longitudinal groove extends from a point adjacent to said first end of said stone rod without reaching said first end to a point adjacent to said second end without reaching said second end.

16. The decorative bar defined in claim 1, wherein said metal brace has an "L" shaped cross-section in the region thereof which includes said portion, and wherein said portion is formed by an upper part of the "L".

17. The decorative bar defined in claim 1, wherein said metal brace has an "T" shaped cross-section in the region thereof which includes said portion, and wherein said portion is formed by an lower part of the "T".

18. The decorative bar defined in claim 1, wherein said metal brace has an Christian cross-shaped cross-section in the region thereof which includes said portion, and wherein said portion is formed by a lower part of the cross.

19. The decorative bar defined in claim 1, wherein said flange at at least one end of said metal brace is configured to mount said metal brace and said stone rod on a wall surface that extends parallel to said stone rod.

20. The decorative bar defined in claim 19, wherein said flange at an end of said metal brace is configured to mount said metal brace and said stone rod on a wall surface that extends perpendicular to said stone rod.

21. The decorative bar defined in claim 1, wherein said flange at a first end of said metal brace and said flange at an opposite, second end thereof are configured to mount said stone rod on at least one horizontal surface.

22. The decorative bar defined in claim 1, wherein at least one flange of said metal brace is configured to mount said stone rod on at least one vertical post, whereby said decorative bar forms a railing.

23. The decorative bar defined in claim 1, wherein said longitudinal groove in said stone rod has a depth in the range of ½ to ¾ of an inch.

24. The decorative bar defined in claim 1, wherein said longitudinal groove in said stone bar has a depth of approximately half the height or diameter of the stone bar.

25. A decorative bar configured to be mounted on at least one surface of a room or building, said bar comprising:

(a) an elongate rod formed of natural stone and having a substantially constant cross-sectional shape from a first end to an opposite, second end thereof, said stone rod having a longitudinal groove therein extending along one side from a point adjacent said first end thereof without reaching said first end to a point adjacent said second end;

(b) an elongate metal brace having a portion thereof inserted in and substantially filling said longitudinal groove in said stone rod; and (c) a flange or bracket forming a part of, or being attached to, said metal brace at at least one end thereof, and configured to be attached to said at least one surface, thereby to affix and retain the stone rod in a mounted relationship to said at least one surface with its longitudinal groove on a side thereof which is not readily visible to a casual observer.

26. The decorative bar defined in claim 25, wherein said longitudinal groove extends from a point adjacent to said first end of said stone rod without reaching said first end to a point adjacent to said second end without reaching said second end.

27. The decorative bar defined in claim 25, wherein said metal brace has an "L" shaped cross-section in the region thereof which includes said portion, and wherein said portion is formed by an upper part of the "L".

28. The decorative bar defined in claim 27, wherein said flange or bracket is attached to said metal brace at the lower part of the "L", and wherein said flange or bracket is configured to mount said metal brace and said stone rod on said at least one surface.

29. The decorative bar defined claim 28, wherein the flange or bracket is attached to the metal brace by means of at least one screw.

30. The decorative bar defined in claim 28, wherein the flange or bracket has at least one hole, in a part thereof facing the wall surface, for attachment to said surface by means of at least one screw.

* * * * *